(12) United States Patent
Holliday et al.

(10) Patent No.: US 11,107,234 B2
(45) Date of Patent: Aug. 31, 2021

(54) VALIDATION SYSTEMS AND METHODS FOR HUMAN OR OBJECT DETECTION

(71) Applicant: Infrared Integrated Systems Limited, Northamptonshire (GB)

(72) Inventors: Stuart A. Holliday, Northamptonshire (GB); Timothy J. Wheatley, Northamptonshire (GB)

(73) Assignee: INFRARED INTEGRATED SYSTEMS LIMITED, Northampton (GB)

(*) Notice: Subject to any disclaimer, the term of this patent is extended or adjusted under 35 U.S.C. 154(b) by 13 days.

(21) Appl. No.: 16/738,747

(22) Filed: Jan. 9, 2020

(65) Prior Publication Data

US 2020/0226780 A1 Jul. 16, 2020

Related U.S. Application Data

(60) Provisional application No. 62/791,124, filed on Jan. 11, 2019.

(51) Int. Cl.
*G06K 9/00* (2006.01)
*G06T 7/70* (2017.01)
(Continued)

(52) U.S. Cl.
CPC .............. *G06T 7/70* (2017.01); *G06F 16/784* (2019.01); *G06K 9/6262* (2013.01); *G06T 2207/30196* (2013.01); *G06T 2207/30242* (2013.01)

(58) Field of Classification Search
CPC ........ G06T 7/70; G06F 16/784; G06K 9/6262
(Continued)

(56) References Cited

U.S. PATENT DOCUMENTS 5,581,625 A 12/1996 Connell
6,712,269 B1 3/2004 Watkins
(Continued)

FOREIGN PATENT DOCUMENTS

| EP | 1798670 A1 | 6/2007 |
| EP | 3229047 A1 | 10/2017 |
| WO | 2019191146 A1 | 10/2019 |

OTHER PUBLICATIONS

Senior, Andrew W., et al. "Video analytics for retail", 2007 IEEE Conference on Advanced Video and Signal Based Surveillance. IEEE, 2007, 6 pgs.
(Continued)

*Primary Examiner* — Stephen P Coleman
(74) *Attorney, Agent, or Firm* — Seed Intellectual Property Law Group LLP

(57) ABSTRACT

A system includes a sensor and a remote processing and storage component in communication with the sensor. The sensor generates sensor data indicative of the presence of people or objects in a scene. The remote processing and storage component receives the sensor data from the sensor and performs an automated counting process to determine an automated count of people or objects. The component receives a request to perform a validation process for the sensor. The component also generates and transmits a link to a manual validation page that includes an interface for performing a manual count. The component further receives an indication to start a validation process from the manual validation page, generates an automated count value from the performed automated counting process, and receives manual count data. The component also generates a validation report based on the automated count value and the manual count data.

20 Claims, 5 Drawing Sheets

(51) Int. Cl.
*G06F 16/783* (2019.01)
*G06K 9/62* (2006.01)
(58) Field of Classification Search
USPC .......................................................... 382/103
See application file for complete search history.

(56) References Cited

U.S. PATENT DOCUMENTS

| | | | |
|---|---|---|---|
| 7,623,936 | B1 | 11/2009 | Qu et al. |
| 7,652,687 | B2 | 1/2010 | Sorensen |
| 7,702,132 | B2 | 4/2010 | Crabtree |
| 7,778,855 | B2 | 8/2010 | Holliday |
| 8,615,420 | B2 | 12/2013 | Holliday |
| 9,993,166 | B1 | 6/2018 | Johnson et al. |
| 2005/0104959 | A1 | 5/2005 | Han et al. |
| 2005/0222723 | A1 | 10/2005 | Estes et al. |
| 2007/0008113 | A1 | 1/2007 | Spoonhower et al. |
| 2008/0067244 | A1 | 3/2008 | Marks |
| 2008/0077511 | A1 | 3/2008 | Zimmerman |
| 2008/0239073 | A1* | 10/2008 | Ruohonen ............... G07C 11/00 348/143 |
| 2009/0097706 | A1 | 4/2009 | Crabtree |
| 2010/0039233 | A1 | 2/2010 | Niedzwiecki et al. |
| 2010/0061553 | A1 | 3/2010 | Chaum |
| 2010/0235004 | A1 | 9/2010 | Thind |
| 2010/0299116 | A1 | 11/2010 | Tomastik et al. |
| 2011/0024500 | A1 | 2/2011 | McReynolds et al. |
| 2011/0213588 | A1 | 9/2011 | Lin et al. |
| 2012/0191272 | A1 | 7/2012 | Andersen et al. |
| 2012/0274775 | A1 | 11/2012 | Reiffel |
| 2012/0281094 | A1 | 11/2012 | Forshaw |
| 2012/0310376 | A1 | 12/2012 | Krumm et al. |
| 2014/0107846 | A1 | 4/2014 | Li |
| 2015/0022321 | A1 | 1/2015 | Lefevre |
| 2015/0032556 | A1 | 1/2015 | Evans et al. |
| 2015/0224640 | A1 | 8/2015 | Vu et al. |
| 2015/0235237 | A1 | 8/2015 | Shaw et al. |
| 2015/0339920 | A1 | 11/2015 | Cortelyou et al. |
| 2017/0181401 | A1 | 6/2017 | Lefevre et al. |
| 2017/0278264 | A1* | 9/2017 | Liu ........................ G06T 7/20 |
| 2017/0316262 | A1 | 11/2017 | Holliday et al. |
| 2018/0089616 | A1 | 3/2018 | Jacobus et al. |
| 2019/0012607 | A1 | 1/2019 | Holliday et al. |

OTHER PUBLICATIONS

International Search Report and Written Opinion of the ISA/EP in PCT/EP2020/050603, dated Mar. 31, 2020, 12 pgs.

Hanchuan, et al., "ID-Match: A Hybrid Computer Vision and RFID System for Recognizing Individuals in Groups", In Proceedings of the 2016 CHI Conference on Human Factors in Computing Systems, 12 pgs.

Fukuda, et al., "Personal identification in dynamic images using UHF band RFID system for service provision", 2008 IEEE International Conference on Multisensor Fusion and Integration for Intelligent Systems, 6 pgs.

Antunes, D., "Multi-sensor Based Localization and Tracking for Intelligent Environments," Dissertation to Obtain the Master Degree in Informatics and Computer Engineering, Technical University of Lisbon, Oct. 2011, 88 pgs.

Basalamah, A., "Sensing the Crowds Using Bluetooth Low Energy Tags," IEEE Access, 4:4225-4233, Aug. 2016, 9 pgs.

Connell et al. "Retail Video Analytics: An Overview and Survey," Video Surveillance and Transportation Imaging Applications, Proc. vol. 8663. International Society for Optics and Photonics, Mar. 2013, 7 pgs.

Extended Search Report for EP Application No. 14178914.9, dated Jul. 3, 2015, 6 pgs.

International Search Report and Written Opinion of the ISA/EP in PCT/EP2019/066525, dated Sep. 23, 2019, 14 pgs.

Texas Instruments, "Introduction to the Time-of-Flight (ToF) System Design," Users Guide, Literature Number: SBAU219D, May 2014, 32 pgs.

Texas Instruments, "Time-of-Flight Camera—An Introduction," Technical White Paper, Literature Number: SLOA190B, May 2014, 10 pgs.

Yamamiya et al., "Using Infrared-Transparent Pigments to Identify Objects," Systems and Computers in Japan, 33(10):74-82, Sep. 2002, 9 pgs.

* cited by examiner

VALIDATION SYSTEMS AND METHODS FOR HUMAN OR OBJECT DETECTION

CROSS REFERENCES

This application claims the benefit of U.S. Provisional Application No. 62/791,124, filed Jan. 11, 2019, the content of which is hereby incorporated by reference in its entirety.

BACKGROUND

Several known systems and methods exist to count or detect people or objects, for example near points of service, such as customers waiting in line at retail locations, people or objects at shop floors, airports, hospitals, secured areas, and the like. Counting and detection systems may facilitate shortening wait times at a point of service, and monitor traffic (e.g., number of people present in a specific location) in an area of interest. Such systems are described, for instance, in U.S. 2017/0316262A1 and U.S. 2015/0032556 A1 each assigned to InfraRed Integrated Systems Ltd., Northampton, GB. Another count and detection system is the Gazelle 2 Dual View System developed by InfraRed Integrated Systems Ltd., Northampton, GB.

Some such detection and counting systems Typically rely on directly detecting and counting people, using direct detection/sensing method such as video analytics from CCTV coverage of the space, direct human counting (e.g., via biometric recognition) or RFID, WiFi or other tags, active transmitters, optical methods (e.g., reflective clothing, identification badges, facial recognition and the like). Such systems may also rely on people crossing an area (e.g., a "virtual" line being crossed) to determine a count.

SUMMARY

In general, the disclosure describes systems and methods for identifying certain people or objects based data captured from sensing devices. In some aspects of the disclosure, systems and methods disclosed herein are capable of distinguishing people or objects from others for a variety of purposes. Counting systems according to various embodiments can include one or more sensing devices used for counting objects in a space via sensing data, such as thermal data, depth image data, video data, or the like. In various examples, systems can include one or more visible light cameras, infrared (IR) cameras, structured lighting depth scanners, LIDAR scanners, and/or stereo camera systems. In some examples, systems can include one or more illuminators, for example, to aid in sensing and/or tracking people or objects in a scene. In some embodiments, illuminators are configured to emit light in one or more non-visible spectrums of light, such as infrared, terahertz, or millimeter wave radiation.

In one example, a system for validating an automated counting process is described. The system includes a first sensor configured to generate sensor data indicative of the presence of people or objects in a scene. The system also includes a remote processing and storage component in communication with the first sensor, the remote processing and storage component being configured to receive the sensor data from the first sensor and perform an automated counting process to determine an automated count of people or objects. The remote processing and storage component is further configured to receive a request to perform a validation process associated with the first sensor. The remote processing and storage component is also configured to generate and transmit a link to a manual validation page displayable via a manual counting tool in response to the received request, the manual validation page including an interface for performing a manual count. The remote processing and storage component is further configured to receive an indication to start a validation process from the manual validation page. The remote processing and storage component is also configured to perform the automated counting process based on the sensor data received from the first sensor in response to the received indication to start the validation process. The remote processing and storage component is further configured to generate an automated count value from the performed automated counting process. The remote processing and storage component is also configured to receive manual count data, the manual count data being representative of a manual count performed via the manual validation page. The remote processing and storage component is further configured to generate a validation report based on the automated count value and the manual count data.

In another example, a method for validating an automated counting process is described. The method includes receiving, by a remote processing and storage component, sensor data from a first sensor, wherein the sensor data is indicative of the presence of people or objects in a scene. The method further includes receiving, by the remote processing and storage component, a request to perform a validation process associated with the first sensor. The method also includes generating and transmitting, by the remote processing and storage component, a link to a manual validation page displayable via a manual counting tool in response to the received request, the manual validation page including an interface for performing a manual count. The method further includes receiving, by the remote processing and storage component, an indication to start a validation process from the manual validation page. The method also includes performing, by the remote processing and storage component, the automated counting process based on the sensor data received from the first sensor in response to the received indication to start the validation process. The method further includes generating, by the remote processing and storage component, an automated count value from the performed automated counting process. The method also includes receiving, by the remote processing and storage component, manual count data, the manual count data being representative of a manual count performed via the manual validation page. The method further includes generating, by the remote processing and storage component, a validation report based on the automated count value and the manual count data.

In another example, a non-transitory computer-readable storage medium is described. The non-transitory computer-readable storage medium containing instructions that, when executed, cause one or more processors of a remote processing and storage component to receive sensor data from a first sensor, wherein the sensor data is indicative of the presence of people or objects in a scene. The instructions further cause the one or more processors to receive a request to perform a validation process associated with the first sensor. The instructions also cause the one or more processors to generate and transmit a link to a manual validation page displayable via a manual counting tool in response to the received request, the manual validation page including an interface for performing a manual count. The instructions further cause the one or more processors to receive an indication to start a validation process from the manual validation page. The instructions also cause the one or more processors to perform an automated counting process based on the sensor data received from the first sensor in response to the received indication to start the validation process. The instructions further cause the one or more processors to generate an automated count value from the performed automated counting process. The instructions also cause the one or more processors to receive manual count data, the manual count data being representative of a manual count performed via the manual validation page. The instructions further cause the one or more processors to generate a validation report based on the automated count value and the manual count data.

In another example, a method is described, the method including detecting one or more of tracks within a scene, calculating, for each of the one or more detected tracks, a track descriptor, each track descriptor being representative of one or more appearance attributes corresponding to a person or object represented by the detected track, for each detected track, determining, based on the calculated track descriptor associated with the track, whether or not the track corresponds to a person or object of interest, and performing a tracking process in which tracks corresponding to people or objects of interest are handled differently than tracks not corresponding to people or objects of interest.

In another example, a tracking system is described. The tracking system includes a sensing device configured to generate sensing data representative of one or more people or objects in a scene. The tracking system further includes a plurality of detectable elements having one or more properties identifiable by the sensing device. The tracking system also includes a processor configured to receive sensing data from the sensing device representative of people or objects in the scene, identify tracks within the scene corresponding to people or objects within the scene, process the received sensing data to generate a track descriptor associated with each of the identified people or objects within the scene, each track descriptor being representative of one or more attributes of the corresponding person or object detectable via the sensing device, and determine one or more tracks associated with people or objects of interest based on a detected signature in the generated track descriptors representative of the presence of one or more of the plurality of detectable items.

The details of one or more examples of the disclosure are set forth in the accompanying drawings and the description below. Other features, objects, and advantages of the disclosure will be apparent from the description and drawings, and from the claims.

DETAILED DESCRIPTION

Systems and methods disclosed herein can be used for identifying certain people or objects based data captured from sensing devices. In some aspects of the disclosure, systems and methods disclosed herein are capable of distinguishing people or objects from others for a variety of purposes. For example, in retail applications, it may be beneficial to count the number of people entering a store.

Counting systems according to various embodiments can include one or more sensing devices used for counting objects in a space via sensing data, such as thermal data, depth image data, video data, or the like. In various examples, systems can include one or more visible light cameras, infrared (IR) cameras, structured lighting depth scanners, LIDAR scanners, and/or stereo camera systems. In some examples, systems can include one or more illuminators, for example, to aid in sensing and/or tracking people or objects in a scene. In some embodiments, illuminators are configured to emit light in one or more non-visible spectrums of light, such as infrared, terahertz, or millimeter wave radiation.

Figure 1:
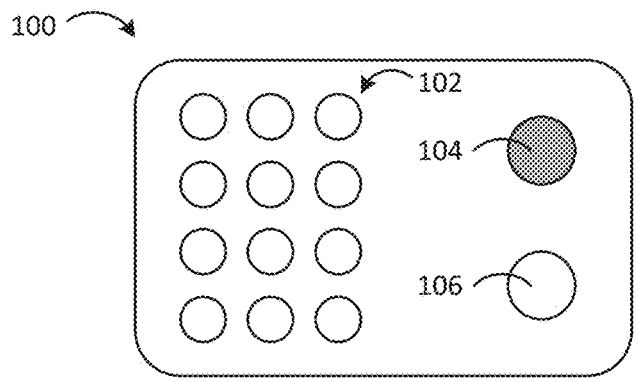
FIG. 1 shows an example time of flight sensor that can be configured to detect people or objects in a space, in accordance with one or more techniques of this disclosure.

In some examples, multiple sensing devices can be embodied in a single tool. FIG. 1 shows an example time of flight sensor that can be configured to detect people or objects in a space. Time of flight sensor 100 includes an illuminator 102 configured to illuminate a scene, for example, with near infrared light. The time of flight sensor 100 of FIG. 1 further includes a visible light camera 104. The time of flight sensor 100 can operate similar to those produced by Infrared Integrated Systems Ltd. In some examples, time of flight sensor 100 illuminates a scene via illuminator 102 and receives light from the scene at the time of flight camera 106. Based on the timing of the received signal relative to the illumination, the time of flight sensor 100 can be configured to determine a depth profile of the target scene. Visible light image data from visible light camera 104 can be used to supplement this depth profile and provide context to the scene.

Figure 2:
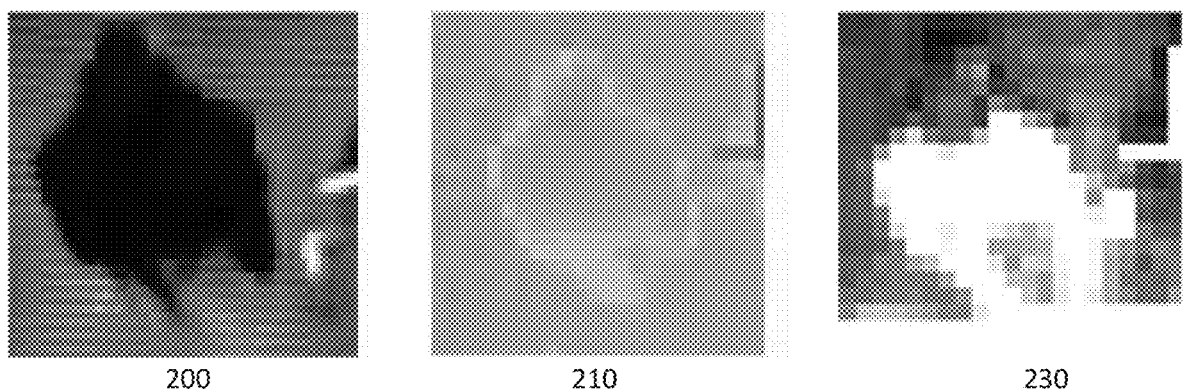
FIG. 2 shows example data streams available from an example time of flight sensor, in accordance with one or more techniques of this disclosure.

FIG. 2 shows example data streams available from an example time of flight sensor such as sensor 200 in FIG. 1. Data streams include a reflected amplitude image 210, depth information 220, and the signal received at the time of flight camera 230, which can be used to calculate the depth information 220. In some embodiments, one or more such data streams can be used to identify people or objects in the field of view of the sensor 200.

During example operation, when one or more people or objects move through the field of view of a sensor (e.g., time of flight sensor 200), the locations of such people or objects are tracked by a computer vision system (e.g., software configured to identify such people or objects from data provided by the sensor). When implemented as a people counter, for example, people that walk through the field of view of a sensor are recorded in a sequence of images (e.g., similar to 210, 220, and/or 230), and the movement of each person within the scene from frame to frame is aggregated into a track. Tracks and/or individual scenes can be analyzed in real time and/or after data has been collected over a period of time (e.g., at the end of a day, end of a week, etc.) to perform various analyses.

Figure 3A:
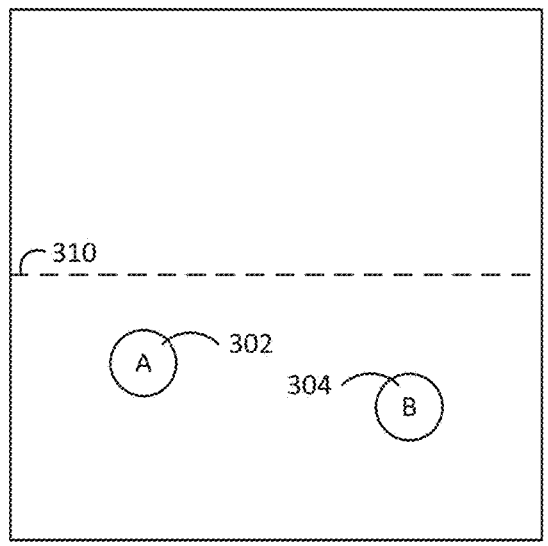
FIGS. 3A and 3B shows a simple example of a people-counting process, wherein an example system counts people crossing an identified line, in accordance with one or more techniques of this disclosure.
Figure 3B:
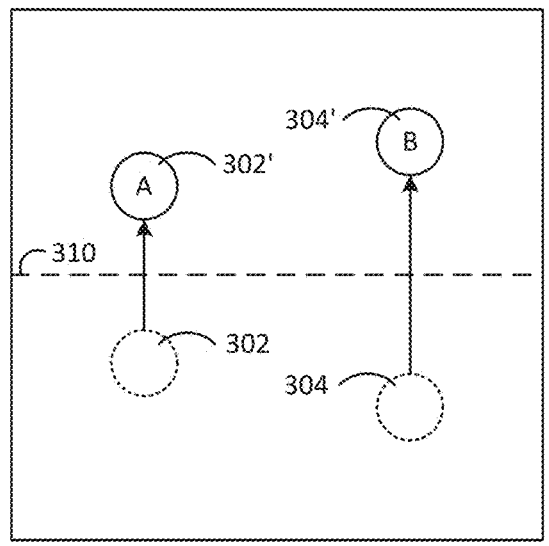

FIG. 3 shows a simple example of a people-counting process, wherein an example system counts people crossing an identified line. As shown in FIG. 3A, people A and B are positioned within a scene at locations 302 and 304, respectively, on a first side of line 310. As shown in FIG. 3B, people A and B have moved to locations 302' and 304', respectively, crossing line 310 in the process. A system configured to count people crossing line 310 can count two people (A and B) having crossed the line 310 during an automated counting process. In an example implementation, line 310 can represent a store exit and the tracks of people A and B crossing line 310 indicate that people A and B have left the store.

Information such as a count of a number of people entering and leaving an establishment can be useful for a variety of purpose. In an implementation example, a count of number of people who enter and leave a store can be compared to the number of transactions to determine a conversion rate, generally indicating a proportion of people entering a store are subject to a transaction in the store. The conversion rate can be used as a metric of how effectively a store is operating, and can be valuable information to a store manager.

Additionally, in some examples, in order to establish an accurate measure of a store's success, a store manager may desire to verify that the counting information used in establishing the metric, such as the conversion rate, is accurate. Accordingly, in some cases, a store manager may request validation of a counting system, for example, from a system installer.

Typically, a store manager requests a validation from a system installer. To perform the validation process, the installer makes a validation recording, for example, a recording from a sensor (e.g., a time of flight sensor) over a time period for which the system established an automated count (e.g., a number of people crossing a line). The validation recording can include, for example, a video (e.g., visible light video) representing the counting area over the time period corresponding to the performed count. The installer can play the validation recording and manually count the number of people or objects over the period of time. For example, the installer can manually count the number of people crossing a line within the validation recording, compare the manual count to the count recorded by the system, and report the results to the store owner. This alerts the store owner and installer as to whether or not the counting system is functioning properly and, in some implementations, if remedial action is necessary.

Figure 4:
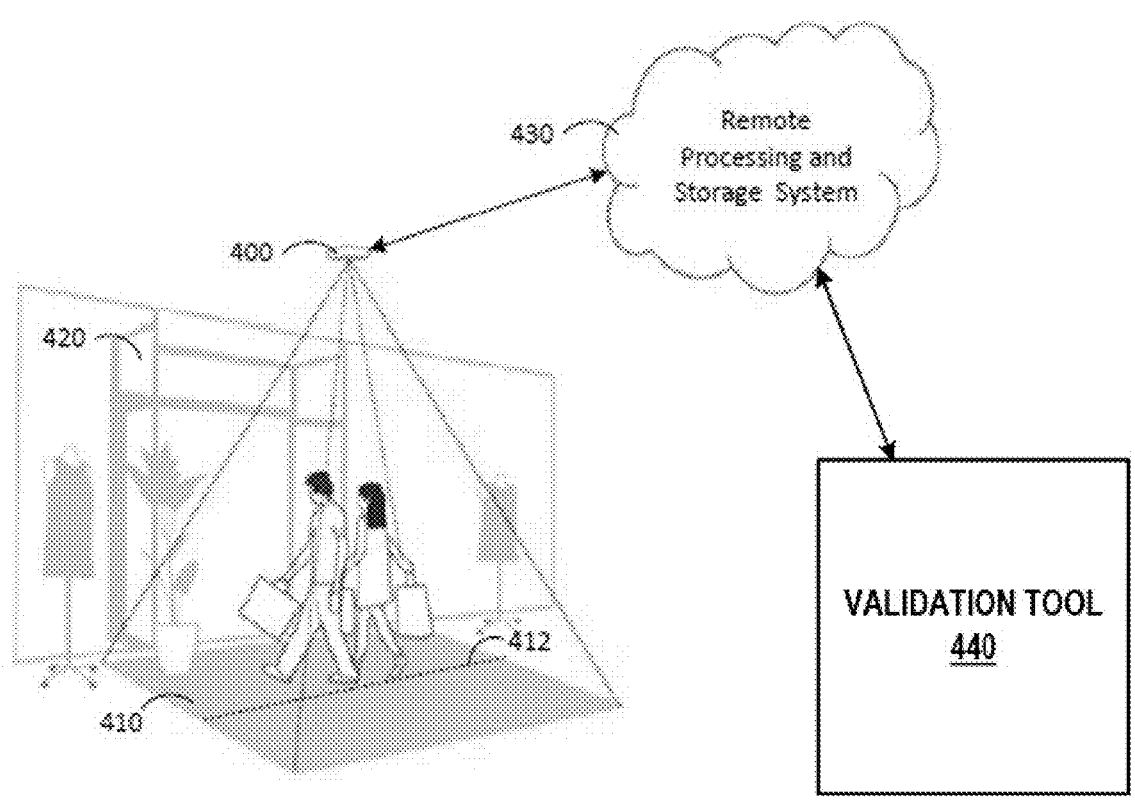
FIG. 4 shows an example system allowing for a remote validation of a counting system, for example, to be performed by an installer, in accordance with one or more techniques of this disclosure.

FIG. 4 shows an example system allowing for a remote validation of a counting system, for example, to be performed by an installer. As shown, a counting sensor 400 (e.g., a time of flight sensor) is positioned to view an area 410 proximate a doorway 420. Sensor 400 can be configured to count people or objects in area 410, such as counting a number of people crossing a line 412 within the area 410. In some examples, counting is performed in the sensor 400 itself. Additionally or alternatively, the sensor 400 can be in communication to a remote processing and storage component 430, such as via the internet, which can be configured to perform calculation and/or data storage. The remote processing and storage component 430 can include a cloud-based computing network or a remote server. In some examples, various processes performed via the remote processing and storage component 430 can be controlled and/or set up by an installer of the sensor 400.

In the illustrated example, sensor 400 can be configured to transmit data (e.g., count data and/or raw sensing data used to generate count data) to the remote processing and storage component 430, for example, via the internet. In some examples, the sensor 400 is configured to record video (e.g., visible light image video) and upload the video in real time and/or at a later time to a remote processing and storage component 430 where it may be accessed by a validation tool 440 used by an installer.

In some examples, to perform a validation process, an installer using the validation tool 440 may view a validation recording in the form of a video uploaded from the sensor 400 to the remote processing and storage component 430 (e.g., via the internet). The validation tool 440 may also receive count data and/or raw data for determining a count data from the sensor 400 via the internet. In some examples, such data is uploaded from the sensor 400 to the remote processing and storage component 430, where it can be accessed from and/or transmitted to the validation tool 440. The installer may use the validation tool 440 to perform a validation process by watching the validation recording and counting a value associated with a count performed by or using the raw data from the sensor 400. The validation tool can assist a user in tracking the count and comparing the results to those calculated by the sensor 400 or from the raw data generated by the sensor 400 to determine an accuracy of the sensor for performing the counting operation.

While such an arrangement can be used to assess the accuracy of a sensor in an establishment, in some cases, a store manager may be skeptical of the installer's validation because, from the store manager's perspective, an installer may have an interest in stating that the installed system counts accurately rather than having an interest in the actual result of the count. At the same time, the store manager has an interest in representing that the store is performing well. Thus, if a counting system provides data that indicates an underperforming store (e.g., a count indicates a large number of customers and corresponding store transaction logs show a comparatively smaller number of purchases), a store manager may still be skeptical of the result of a validation by the installer. The store manager may believe that the installer is self-reporting an accurately installed system rather than reporting any actually existing discrepancies.

Because the store manager wants the store to appear successful, and the installer wants the counting system to be reputedly accurate, while both the store manager and installer ultimately desire accuracy, their motivations are not necessarily aligned. This can lead to a relationship of distrust between the parties. An installer may believe that a store manager is misrepresenting the accuracy of the counting system to improve the appearance of the success of the store, and the store owner may believe that the installer is inaccurately validating the data to improve the appearance of the accuracy of the system.

Figure 5A:
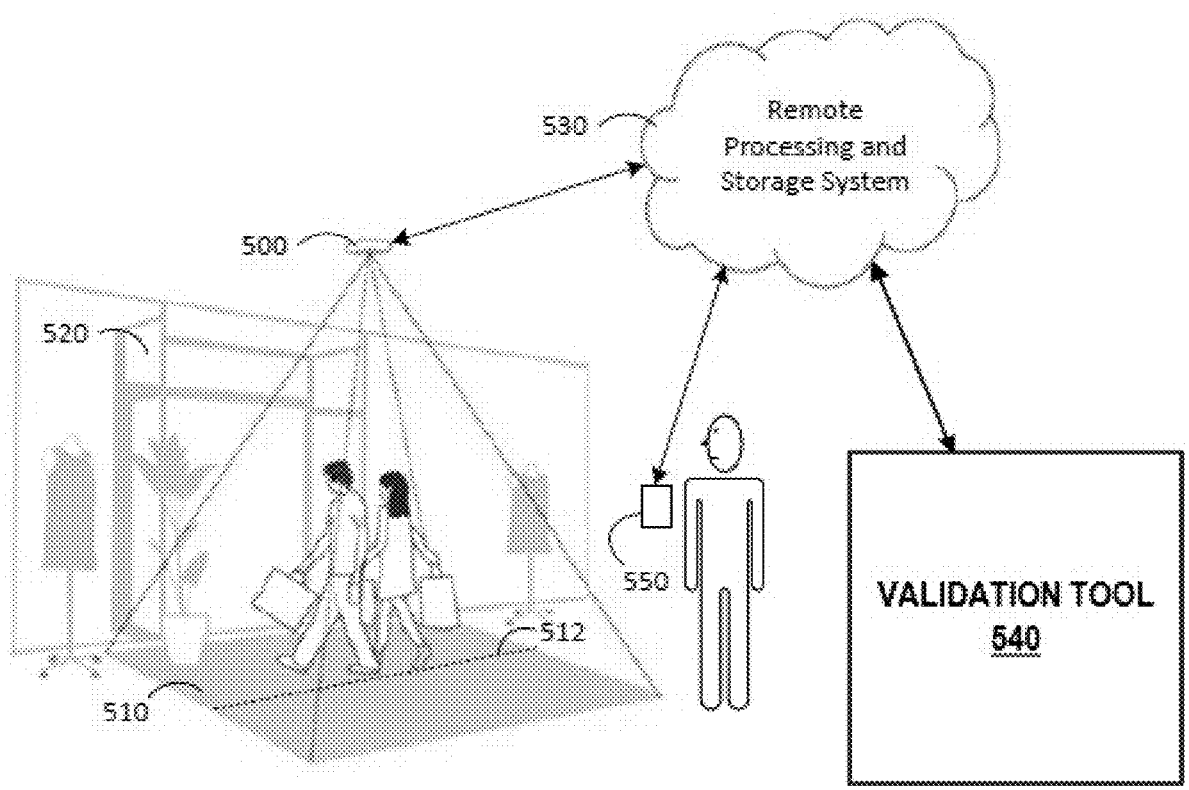
FIG. 5A shows a system that can be used for validating the counting operation of a sensor and including a manual counting tool for on-site validation, in accordance with one or more techniques of this disclosure.

FIG. 5A shows a system that can be used for validating the counting operation of a sensor and including a manual counting tool for on-site validation. In the example shown in FIG. 5A, a counting sensor 500 (e.g., a time of flight sensor) is positioned to view an area 510 proximate a doorway 520. Sensor 500 can be configured to count people or objects in area 510, such as counting a number of people crossing a line 512 within the area 510. In some examples, counting is performed in the sensor 500 itself. Additionally or alternatively, the sensor 500 can be in communication to a remote processing and storage component 530, such as via the interne, for remote calculation.

Similar to described with respect to FIG. 4, a validation tool 540 can receive information (e.g., a validation recording, count information, etc.) from the sensor 500 and/or a remote processing and storage component 530 in communication with the sensor 500. The system shown in FIG. 5 includes a manual counting tool 550. In some examples, a store manager can use the manual counting tool 550 to perform a real-time count of people or objects, such as people crossing line 512. In various embodiments, the manual counting tool 550 can include a dedicated counting tool, for example, provided with one or more associated sensors 500, or can be implemented, for example, via an application running on a device such as a smartphone, tablet, wearable device (e.g., smartwatch), personal computer, or the like. In the illustrated example of FIG. 5A, manual counting tool 550 can communicate with the remote processing and storage component 530, for example, via an internet connection.

Figure 5B:
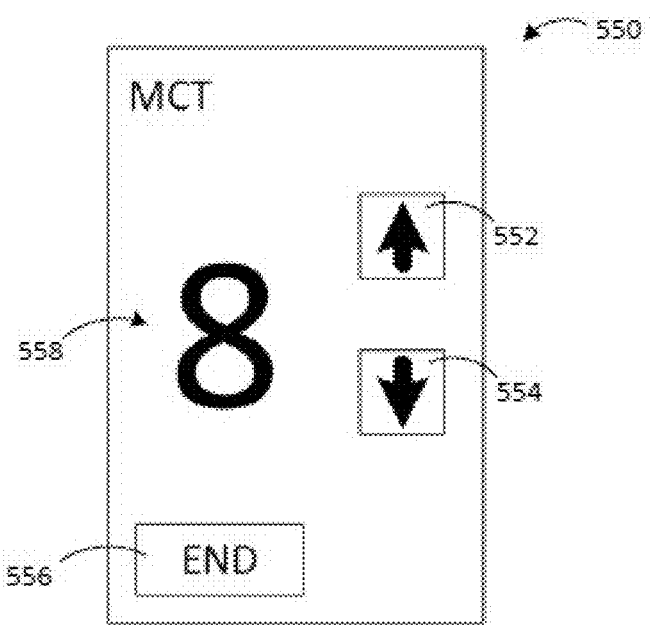
FIG. 5B shows an example interface via manual counting tool, in accordance with one or more techniques of this disclosure.

FIG. 5B shows an example interface via manual counting tool 550. In various embodiments, a manual counting tool 550 can include an incrementing actuator 552, a decrementing actuator 554, and an end actuator 556. The incrementing actuator 552, decrementing actuator 554, and end actuator 556 can be implemented in a variety of ways, such as via one or more buttons, switches, levers, dials, knobs, or other interfacing component via which a user may record an event. Additionally or alternatively, in some examples, incrementing actuator 552, decrementing actuator 554, and end actuator 556 can be presented via a digital display, such as a touchscreen display on a manual counting tool, such as a smartphone.

During operation, a user may use the incrementing actuator 552 to count a number of people or objects, such as people crossing line 512 in FIG. 5A. Decrementing actuator 554 can be used to decrement the count, for example, in the event of an error (e.g., a user accidentally actuating the incrementing actuator 552 more times than desired). In some examples, the manual counting tool 550 includes a count display 558 showing a real-time count of the entities being counted using the incrementing actuator 552 and decrementing actuator 554. The count display 558 can ensure manual count performed by the user increments or decrements as desired by a user. For instance, a user wishing to increment the count by one can confirm that the count increases by one via the count display 558. If the user has accidentally increased the count by more than the desired amount, the user can use the decrementing actuator 554 to correct the count. Upon completion of a manual count, the user can end the process via end actuator 556.

In some examples, a counting operation using the sensor 500 is performed simultaneously with the manual count. For instance, in some examples, a counting operation using the sensor 500 is initiated at the same time as the manual count begins and ends when the manual counting process is ended (e.g., via end actuator 556). Upon ending the process, the user can be presented with a count value generated by the data from sensor 500 corresponding to the duration of the manual count, which the user can compare to the manual count for validating operation of the counter as well as the local count result. In various embodiments, starting and stopping the count via sensor 500 in accordance with the starting and stopping of the local manual count via the manual counting tool 550 can be performed via direct communication of the sensor 500 and the manual counting tool 550 or via common communication between the components and the remote processing and storage component 530.

Figure 6:
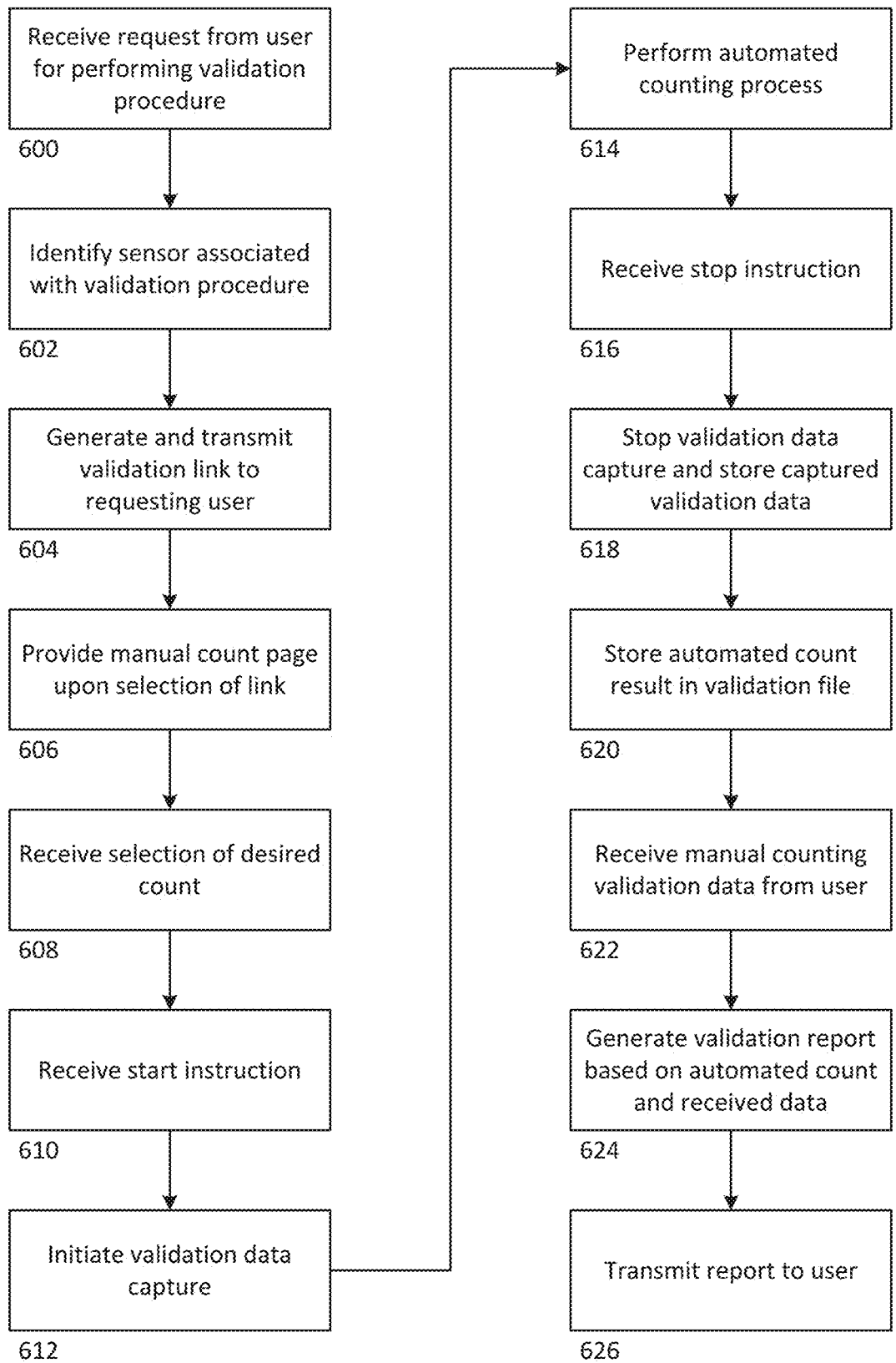
FIG. 6 shows process flow diagram showing an example process, executable by a remote processing and storage component, for providing local manual validation, performing a corresponding counting operation via a sensor, and generating a validation report, in accordance with one or more techniques of this disclosure.

FIG. 6 shows process flow diagram showing an example process, executable by a remote processing and storage component, for providing local manual validation, performing a corresponding counting operation via a sensor, and generating a validation report. In the illustrated example of FIG. 6, a remote processing and storage component receives a request from a user for performing a validation procedure (600). In some examples, a manual counting tool (e.g., 550 in FIGS. 5A and 5B) enables a user (e.g., a store manager) to request a manual validation.

In some examples, the request includes information related to the desired validation count, such as a location for performing the count. For instance, in an example implementation, a user can be a store manager managing a store having a plurality of sensors configured for counting people (e.g., proximate multiple entrances/exits or other locations). In such an example, the store manager can select which of the plurality of sensors is to be used during the validation. The selection can be made, for example, from a list of sensors associated with the user (e.g., with the user's manual counting tool and/or a login associated with the user).

The method shown in FIG. 6 includes identifying a sensor associated with the requested validation procedure (602). For example, as noted elsewhere herein, a request received from the user (e.g., step 600) can include information identifying a sensor associated with the user. Such information, coupled with, for example, a user identification (e.g., a user login or associated manual counting tool) can be used to identify the particular sensor (e.g., sensor 500) for which the user wishes to perform a validation process.

In some examples, a particular installer may have installed and/or oversee operation of one or more counting sensors at a plurality of different locations. Thus, the received request from the user can identify the particular sensor at the particular location for validation.

The method of FIG. 6 includes generating and transmitting a validation link to the requesting user (604). Transmitting the link can include transmitting the link to the user's manual counting tool The link can include, for example, a hyperlink that, when launched by the manual counting tool, links the manual counting tool with the corresponding sensor to be validated. In an exemplary embodiment, after requesting a validation procedure, the user may receive a communication (e.g., an email, an SMS message, etc.) including the validation link. The user selects the link when prepared to perform the manual validation.

In some embodiments, a manual count page is provided to the manual counting tool to the user upon selection of the link (606). For instance, in some examples, a remote processing and storage component provides a manual count page similar to a webpage in response to the user selecting the link. Since the link corresponds to the particular sensor identified by the user, the resulting manual counting page can also be associated with the particular sensor.

The method shown in FIG. 6 further comprises receiving a selection of a desired count to be performed (608). For instance, with respect to the illustrated example of FIG. 5A, a desired count can include a total number of people crossing line 512, a total number of people crossing the line 512 in one direction only, a total number of people observed in area 510, or other counting criteria.

After receiving a selection of the desired counting method (608), the remote processing and storage component can receive a start instruction (610), initiate validation data capture (612), and perform a counting process (614). For example, a user may instruct the remote processing and storage component to initiate the counting process via a start actuator (not shown) on the manual counting page accessed via the link. In some examples, prior to starting the counting process, the end actuator 556 may act as a start actuator. Additionally or alternatively, the user may begin the process by counting the first object to be counted using the incrementing actuator 552.

Upon receiving instruction to start (610), initiating validation data capture (612) can include, for example, recording video (e.g., visible light video validation recording) from the sensor and saving the video internally to the sensor and/or directly to a remote processing and storage component. Additionally or alternatively, capturing validation data can include other data provided by a sensor, such as time of flight data. Similarly, performing the counting process (614) based upon data from the sensor (e.g., time of flight data from a time of flight sensor) can be performed internally in the sensor or at the remote processing and storage component in communication with the sensor. The counting process in step 614 can include an automated tracking process performed using the sensor data to count the desired objects.

In the meantime, while the validation data is captured and the remote processing and storage component performs the automated counting process, the local user uses the manual counting tool (e.g., 550) to manually count the desired object (e.g., people crossing a line in the particular direction), for example, using the incrementing actuator 552 and decrementing actuator 554.

In some examples, the user is provided (e.g., via the manual count page) with a recommended time or count, such as a recommended minimum count. Such a minimum count can be used to ensure that enough data points are recorded so that discrepancies between the manual and automated count values can be statistically significant. In some such examples, the user can be notified by the manual counting tool when the recommended minimum count is surpassed.

When the user has completed the manual count (e.g., after a recommended amount of time or after at least a recommended minimum number of people are counted), the user can end the counting process, for example, using end actuator 556. Upon receiving a stop instruction (616), the remote processing and storage component can stop the capturing of validation data and store the captured validation data. For instance, in some examples, validation data comprises a video that can be stored as a validation recording (618). The validation data (e.g., a validation recording) can be stored locally at the sensor (e.g., 550) and/or transmitted to the remote processing and storage component (e.g., 530). The remote processing and storage component can also store the automated count result in a validation file (620).

The remote processing and storage component can receive manual counting validation data from the user (622), for instance, via the manual counting tool. In an example embodiment, upon actuating the end actuator 556 on the manual counting tool 550, the manual count (e.g., as indicated on the count display 558) is transmitted from the manual counting tool 550 to the remote processing and storage component.

The remote processing and storage component can generate a validation report based on the automated count (e.g., performed from data from the identified sensor) and the received data (e.g., the received manual counting validation data) (624) and transmit the report to the user (626).

The report can include the result of the automated count during the validation period and the result of the manual validation count so that the user can compare the result of the automated count used by the sensor and the count that the user performed in real time. In some embodiments, transmitting the report to the user can include automatically transmitting the report to the manual counting tool for presentation to the user. Additionally or alternatively, the report can be sent as an attachment or a link, such as via an email, SMS message, or the like.

The report can provide the user an indication of the accuracy of the automated counting scheme utilizing the data from the selected sensor. Moreover, because the user performed the manual validation, the user is more likely to trust the results when compared to a validation performed by an installer motivated to demonstrate system accuracy. In some examples, the report can include a suggestion as to whether or not the sensor is performing correctly. For example, in some embodiments, generating the report includes determining a discrepancy between the manual validation information and the automated count (e.g., an absolute difference and/or a percentage difference). If the discrepancy is sufficiently large (e.g. satisfies an absolute threshold or a threshold percentage difference), the report can include an indication that the sensor is not operating correctly or a recommendation for service, replacement, calibration of the sensor. Additionally or alternatively, in some embodiments, sufficiently large discrepancy between the manual validation information and the automated count can initiate an automated optimization of the sensor and/or the counting process utilizing data from the sensor to make the system and manual counts match. In some such examples, the optimization can be performed at the sensor itself or at a different location, such as a remote processing and storage component in communication with the sensor and configured to perform automated counting processes utilizing data from the sensor.

If, upon viewing the report comparing the automated count to the user's manual validation count, the user is satisfied with the accuracy of the automated count, the user can proceed using the sensor as currently configured. However, if the user is unsatisfied with the accuracy, the user can report the error to the installer for calibration of the sensor and/or adjustment of the counting technique (e.g., an algorithm employed by the system for performing an automated count using the sensor data) to improve the counting accuracy.

If the installer receives such a request from the user (e.g., a store manager), the installer can access the validation file (e.g., from step 620) and validation data (e.g., a validation recording) associated with the user-initiated validation process and perform their own validation count. For example, the installer may view a validation recording including a video and perform a count to confirm the user's account of the validation. If the installer agrees that there is sufficient inaccuracy with the operation of the sensor, the installer can perform one or more corrective actions, such as repairing, replacing, or calibrating the sensor, updating a counting algorithm, or other actions.

Actions described with respect to FIG. 6 can be implemented in a variety of ways. For instance, in some examples, the remote processing and storage component includes a cloud-based computing network (e.g., 530). The cloud-based computing network can communicate (e.g., via the internet) with a sensor (e.g., 500) and a manual counting tool (e.g., 550) associated with a particular user to receive requests and instructions (e.g., steps 600, 610, 616) and data (e.g., video, counting data). In some examples, the system can receive raw data from the sensor to perform the automated count using the sensor data and video from the sensor. As described elsewhere herein, the sensor can transmit video in real-time to a cloud-based computing network. Additionally or alternatively, the sensor can store a video file locally in a sensor memory, and the file can be transmitted to the cloud-based computing network after it has been saved. Other validation data, such as time of flight data or the like, can be similar transmitted in real-time and/or saved locally for future access/transfer.

Similarly, in some examples, the remote processing and storage component can include a central server, for example, hosted by the installer. Similar to the cloud-based computing network, the central server can receive data, perform calculations, and transmit data over a network, such as the internet.

In some examples, a remote processing and storage component hosted or otherwise controlled by the installer (e.g., as a central server or a cloud-based computing network) can be used to service a plurality of customers, such as a plurality of store locations. In some such examples, the remote processing and storage component can perform processes such as described with respect to FIG. 6 for one or more sensor associated with each of the plurality of customers. Customer identification information and knowledge of the installed systems at various customer locations can be used to determine the customer and sensor for which validation is being requested (e.g., step 602). Similarly, such knowledge can be used to generate and transmit a validation link to the appropriate customer (e.g., a manual counting tool associated with the customer) and corresponding to the identified sensor.

In some examples, one or more steps in FIG. 6 can be performed locally, for example, at the sensor to be validated. For instance, in some embodiments, the sensor can link directly with the manual counting tool, such as via a Bluetooth connection. The sensor can receive the starting instruction (610) and stop instruction (616) from the manual counting tool and perform the automated count locally. The automated count can be communicated to the manual counting tool, and the validation report can be generated at the manual counting tool. Additionally or alternatively, the manual counting validation data can be communicated to the sensor, which can generate the validation report.

In still further examples, one or more steps in FIG. 6 can be performed via the manual counting tool. For example, in some embodiments, the manual counting tool can be configured to receive raw sensor data from the sensor and perform the automated counting process using the raw sensor data. Additionally or alternatively, the manual counting tool can generate the validation report based on the manual counting validation data and automated count data, for example, received from the sensor, either via a network connection (e.g., via the internet) or a local connection (e.g., a wired connection or a wireless connection, such as via Bluetooth).

In general, while described generally with respect to a remote processing and storage component, various steps in the method illustrated in FIG. 6 can be performed in a variety of locations, such as a remote processing and storage component (e.g., a central server of a cloud-based computing network), locally in a sensor, or in a manual counting tool.

Figure 7:
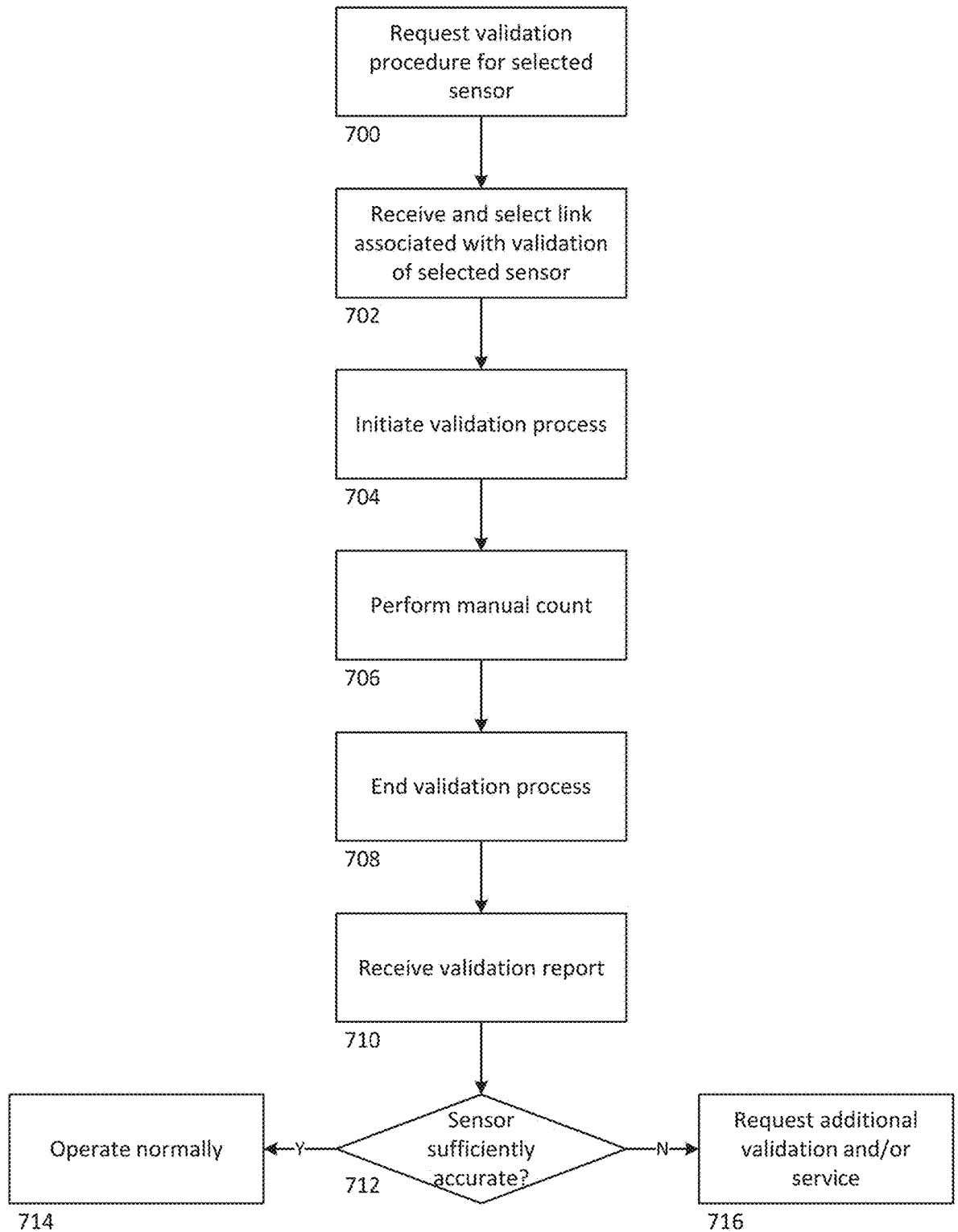
FIG. 7 shows an example process-flow diagram from a user's perspective, in accordance with one or more techniques of this disclosure.

FIG. 7 shows an example process-flow diagram from a user's perspective. The user (e.g., a store manager) wishing to validate a given sensor used in a counting process requests a validation procedure for a selected sensor (700). The user receives and selects a link associated with validation of the selected sensor (702). As described elsewhere herein, selecting the link can open a manual counting page on a manual counting tool.

The user can initiate the validation process (704) and perform the manual count (706) (e.g., via incrementing and decrementing actuators provided by the manual counting tool). After performing the manual count (706), the user can end the validation process (708) and receive a validation report (710) including information regarding the manual count and a corresponding automated count over the same counting period.

As described elsewhere herein, the user can decide whether or not the sensor is sufficiently accurate (712) based on the validation report. If so, the sensor can be operated normally (714), such as for typical counting operations. If not, the user may request additional validation and/or service (716) for confirming and/or addressing the detected inaccuracy. For example, the user may report the detected inaccuracy to the installer, who may perform their own validation. If both the user validation process and the installer validation process show sufficient inaccuracy with the operation of the sensor, the installer can perform one or more corrective actions, such as repairing, replacing, or calibrating the sensor, updating a counting algorithm, or other actions.

In some examples, determining whether or not the sensor is sufficiently accurate (712) can be performed subjectively by the user. Additionally or alternatively, the validation report can suggest to the user whether or not the sensor is sufficiently accurate as described elsewhere herein.

Manual validation techniques such as those described herein can be applied in a variety of situations. For example, similar to the scene described with respect to FIG. 5A, a count performed by the sensor can correspond to a count of a number of people entering and/or leaving a store. In some examples, a count can correspond to a number of people traveling through a particular pathway, a number of people dwelling in one or more identified zones, or the like.

Illustrative Example

An example embodiment is described below in which the manual counting tool (e.g., 550) is implemented as a software program running on an internet connected device (e.g., a smartphone or tablet) in communication with a cloud-based validation software (e.g., operating on a cloud-based computing network).

The manual counting tool allows the user to manually increment a register on the internet connected device when a customer either enters or exits the store. Before the manual counting tool allows the manual counting process to start, it sends a message to the cloud based validation software instructing it to start capturing a validation sequence recording the actual count values on the installed counting device as well as a validation video to allow later auditing, once this has been confirmed to the manual counting tool by the validation software the start time of the manual validation is recorded and the process can begin. As each customer enters or exits the store, the operator increments the register in the manual counting tool and the manual counting tool records the time at which the count increment was registered. The process continues until a suitable number of people have been counted.

Once the manual count is complete, the operator exits the application at which point the manual counting tool sends a message to the validation software along with a file containing the manual count increments and associated time stamps. On receiving this message, the validation software will stop the validation sequence capture and report the counting device count for the period back to the manual counting tool. This allows the operator to immediately know the accuracy of the counting device.

If the accuracy of the counting device is called into question, then the installer can review the validation sequence using the validation software and video sequence to verify both the accuracy of the manual count entered on the manual counting tool and the system count generated by the counting device.

In some cases, counting sensors/systems can be configured to exclude certain people or objects from a count, such as employees of a store, children, family groups, or objects, such as shopping carts or trolleys, baskets, or the like. Identification and/or exclusion of such people and/or objects of interest can be performed as described in U.S. Provisional Patent Application No. 62/688,634, filed Jun. 22, 2018, and entitled DETECTION AND IDENTIFICATION SYSTEMS FOR HUMANS OR OBJECTS, and U.S. Provisional Patent Application No. 62/791,082, filed Jan. 11, 2019, and entitled DETECTION AND IDENTIFICATION SYSTEMS FOR HUMANS OR OBJECTS, each of which is incorporated herein by reference in its entirety. In some embodiments, similar validation processes can be applied to confirm that the staff identification/exclusion techniques are operating properly. For instance, in an example implementation, a user (e.g., a store manager) can choose to perform a staff exclusion validation process. With reference to FIG. 5A, the store manager can perform a counting process using the manual counting tool 550 that treats people of interest (e.g., staff members) differently than others (e.g., customers). Such counting processes can include counting customers crossing line 512 in a first direction while excluding staff members or counting staff members exclusively that cross line 512.

In various embodiments, staff exclusion can be performed by counting customers that are not staff members or by counting a total number of people and a total number of staff members and subtracting the number of staff from the total to determine a number of customers. Depending on the count performed using the sensor data, the count performed by the store manager using the counting tool 550 can match an automated count performed using the sensor data and accounting for staff in the scene.

For example, if the data from sensor 500 is used to count only customers crossing line 512 and ignore staff entirely, the store manager can use the manual counting tool 550 to similarly count only customers crossing line 512. In another example, if the data from sensor 500 is used to count a total number of people and a total number of staff crossing line 512, the store manager may count only the number of staff crossing line 512 using the manual counting tool 550. In either case, the validation process allows the store manager to perform a real-time validation process to ensure that the staff identification/exclusion counting schemes are working properly.

As shown, various aspects of the disclosure can be implemented in a variety of ways, such as performing a validation of various counting processes. In some examples, when a user chooses to perform a validation process (e.g., step 700 in FIG. 7), a user may select one validation process (e.g., a staff identification/exclusion validation) from a list of a plurality of possible validation processes. Additionally or alternatively, in some examples, upon requesting validation for a particular sensor, a user may be presented with a plurality of links corresponding to a plurality of possible automated counting processes (e.g., people counting, staff counting, staff exclusion, etc.) that can be validated by the user. The user may select one of the provided links corresponding to the desired validation and proceed with the validation.

For example, a store manager may believe that the general automated counting performed using the data from the sensor (e.g., performed locally by the sensor, performed at a remote location in communication with the sensor, etc.) is acceptable, but may wish to confirm that a staff identification technique is performing acceptably. In some embodiments, the store manager could request validation of a sensor, receive a plurality of links for performing a corresponding plurality of validation procedures, and select a link associated with a staff identification process. Various processes described herein can be performed, wherein the manual and automated counting is performed according to the selected link.

In various examples, providing a customized link to the user to enable a validation process specific to a desired sensor allows for the user (e.g., a store manager) to quickly and easily validate an automated counting process that utilizes data from the desired sensor. Moreover, the user does not have to rely on an installer, who may be incentivized to report a high degree of accuracy for the counting process.

Counting systems, such as described herein, can be implemented in a variety of ways. Counting systems can include one or more sensors, such as a time of flight sensor, configured to provide sensing data that can be analyzed for counting objects, such as people crossing a line within a scene.

Systems can include one or more processors configured to receive and analyze the sensing data, for example, to perform an automated counting process, to receive manual validation count data, and to generate a validation report. In various embodiments, processors can generally include application specific integrated circuits (ASICs), microcontrollers, microprocessors, field-programmable gate arrays (FPGAs), or other appropriate components. In some examples, systems can communicate sensing data to a central server or a cloud-based computing network that can be configured to receive data, such as from one or more sensors and/or one or more manual counting tools, and perform various analyses as described herein.

Systems can include memory for storing various information. Additionally or alternatively, memory can include instructions for causing one or more processors to carry out processes such as those described herein. In various embodiments, memory may include one or more fixed or removable magnetic, optical, or electrical media, such as RAM, ROM, EEPROM, or the like. Memory may also include a removable memory portion that may be used to provide memory updates or increases in memory capacities. Additionally or alternatively, systems can include remote storage capabilities, such as cloud-based storage.

In an example implementation, a counting system (e.g., deployed at a retail establishment) includes a time of flight sensor and a local computer including memory and a processor and configured to receive data from the time of flight sensor. The local computer can be configured to carry out one or more processes described herein. In another example, a local sensor communicates data (e.g., raw sensor data) to a remote location, such as a central server or a cloud-based computing network, where various counting processes can be performed based on the received raw data.

Various examples have been described. These and other examples are within the scope of the following claims.

What is claimed is:

1. A system for validating an automated counting process comprising:
   a first sensor configured to generate sensor data indicative of a presence of people or objects in a scene; and
   a remote processing and storage component in communication with the first sensor, the remote processing and storage component being configured to receive the sensor data from the first sensor and perform the automated counting process to determine an automated count of people or objects; and wherein the remote processing and storage component is configured to:
      receive a request to perform a validation process associated with the first sensor;
      generate and transmit a link to a manual validation page displayable via a manual counting tool in response to receiving the request to perform the validation process associated with the first sensor, the manual validation page including an interface for performing a manual count;
      receive an indication to start the validation process from the manual validation page;
      perform the automated counting process based on the sensor data received from the first sensor in response to receiving the indication to start the validation process;
      generate an automated count value from the automated counting process;
      receive manual count data, the manual count data being representative of the manual count performed via the manual validation page; and
      generate a validation report based on the automated count value and the manual count data.

2. The system of claim 1, wherein the first sensor comprises a time of flight sensor.

3. The system of claim 1, wherein transmitting the link to the manual validation page comprises transmitting the link to a mobile device associated with a user requesting the validation process.

4. The system of claim 1, wherein the manual counting page comprises an incrementing actuator and a decrementing actuator to facilitate generation of the manual count data.

5. The system of claim 1, further comprising a second sensor configured to
   generate second sensor data indicative of the presence of people or objects in a second scene; and
   wherein the remote processing and storage component is configured to:
      receive a request to perform a second validation process associated with the second sensor;
      generate and transmit a second link to a second manual validation page displayable via the manual counting tool in response to receiving the request to perform the second validation process associated with the second sensor, the second manual validation page including an interface for performing a second manual count;
      receive an indication to start the second validation process from the second manual validation page;
      perform a second automated counting process based on second sensor data received from the second sensor in response to receiving the indication to start the second validation process;
      generate a second automated count value from the second automated counting process;
      receive second manual count data, the second manual count data being representative of a second manual count performed via the second manual validation page; and
      generate a second validation report based on the automated count value and the manual count data.

6. The system of claim 1, wherein the manual validation page is displayable via a smartphone, tablet, or personal computer.

7. The system of claim 1, wherein the remote processing and storage component is further configured to:
   receive an indication to stop the validation process from the manual validation page;
   stop performing the automated counting process in response to receiving the indication to stop the validation process; and
   generate the automated count value from the automated counting process between receiving the indication to start the validation process and receiving the indication to stop the validation process.

8. The system of claim 1, wherein the remote processing and storage component is configured to transmit the validation report to a user.

9. The system of claim 8, wherein transmitting the validation report to the user comprises transmitting the validation report to the manual counting tool that accessed the manual validation page.

10. The system of claim 1, wherein generating the validation report comprises determining a discrepancy between the manual count and the automated count value.

11. The system of claim 10, wherein, if the discrepancy between the manual count data and the automated count value is greater than a threshold, the remote processing and storage component is configured to initiate an automated calibration of the first sensor and/or the automated counting process.

12. The system of claim 10, wherein the validation report indicates if the discrepancy between the manual count data and the automated count value is greater than a threshold.

13. The system of claim 1, further comprising a validation tool in communication with the remote processing and storage component, the validation tool being configured to receive validation data and the automated count value from the remote processing and storage component and facilitate a second validation process for validating the automated count value using the validation data.

14. The system of claim 13, wherein the remote processing and storage component is configured to store the validation data associated with the performed automated counting process.

15. The system of claim 14, wherein the remote processing and storage component is configured to provide the validation data associated with the automated counting process to the validation tool.

16. The system of claim 14, wherein the validation data comprises a validation recording.

17. The system of claim 16, wherein the validation recording comprises visible light image data.

18. A method for validating an automated counting process comprising:

receiving, by a remote processing and storage component, sensor data from a first sensor, wherein the sensor data is indicative of a presence of people or objects in a scene;

receiving, by the remote processing and storage component, a request to perform a validation process associated with the first sensor;

generating and transmitting, by the remote processing and storage component, a link to a manual validation page displayable via a manual counting tool in response to receiving the request to perform the validation process associated with the first sensor, the manual validation page including an interface for performing a manual count;

receiving, by the remote processing and storage component, an indication to start the validation process from the manual validation page;

performing, by the remote processing and storage component, the automated counting process based on the sensor data received from the first sensor in response to receiving the indication to start the validation process;

generating, by the remote processing and storage component, an automated count value from the automated counting process;

receiving, by the remote processing and storage component, manual count data, the manual count data being representative of the manual count performed via the manual validation page; and generating, by the remote processing and storage component, a validation report based on the automated count value and the manual count data.

19. The method of claim 18, further comprising:

receiving, by the remote processing and storage component and from a second sensor, a request to perform a second validation process associated with the second sensor;

generating and transmitting, by the remote processing and storage component, a second link to a second manual validation page displayable via the manual counting tool in response to receiving the request to perform the second validation process associated with the second sensor, the second manual validation page including an interface for performing a second manual count;

receiving, by the remote processing and storage component, an indication to start the second validation process from the second manual validation page;

performing, by the remote processing and storage component, a second automated counting process based on second sensor data received from the second sensor in response to receiving the indication to start the second validation process;

generating, by the remote processing and storage component, a second automated count value from the second automated counting process;

receiving, by the remote processing and storage component, second manual count data, the second manual count data being representative of the second manual count performed via the second manual validation page; and generating, by the remote processing and storage component, a second validation report based on the automated count value and the manual count data.

20. A non-transitory computer-readable storage medium containing instructions that, when executed, cause one or more processors of a remote processing and storage component to:

receive sensor data from a first sensor, wherein the sensor data is indicative of a presence of people or objects in a scene;

receive a request to perform a validation process associated with the first sensor;

generate and transmit a link to a manual validation page displayable via a manual counting tool in response to receiving the request to perform the validation process associated with the first sensor, the manual validation page including an interface for performing a manual count;

receive an indication to start the validation process from the manual validation page;

perform an automated counting process based on the sensor data received from the first sensor in response to receiving the indication to start the validation process;

generate an automated count value from the automated counting process;

receive manual count data, the manual count data being representative of the manual count performed via the manual validation page; and generate a validation report based on the automated count value and the manual count data.

* * * * *